US008491980B1

(12) United States Patent
Sommerfeld

(10) Patent No.: US 8,491,980 B1
(45) Date of Patent: Jul. 23, 2013

(54) MATCHED RAIL AND STILE ROUTER BIT SET

(76) Inventor: Marc Sommerfeld, Remsen, IA (US)

( * ) Notice: Subject to any disclaimer, the term of this patent is extended or adjusted under 35 U.S.C. 154(b) by 138 days.

(21) Appl. No.: 13/193,682

(22) Filed: Jul. 29, 2011

Related U.S. Application Data

(60) Provisional application No. 61/368,829, filed on Jul. 29, 2010.

(51) Int. Cl.
*B32B 3/06* (2006.01)
*B32B 3/10* (2006.01)
*B27G 13/14* (2006.01)

(52) U.S. Cl.
USPC .......... 428/60; 144/231

(58) Field of Classification Search
USPC .......... 428/60; 144/231, 237, 135.2, 91.2
See application file for complete search history.

(56) References Cited

U.S. PATENT DOCUMENTS 5,203,389 A 4/1993 Goodwin
7,316,529 B2 1/2008 Phillips et al.

OTHER PUBLICATIONS

Component Male and Female Sets, www.lrhent.com, LRH Enterprises, Inc. Jun. 16, 2010.
Freud Using your Premier Adjustable Rail and Stile System, www.freudtools.com, Jan. 19, 2010.
MLCS Router bits and woodworking products, co-publisher: Katana, Jun. 2, 2010 www.mlcswoodworking.com.

*Primary Examiner* — Alexander Thomas
(74) *Attorney, Agent, or Firm* — Woodard Emhardt Moriarty McNett & Henry LLP

(57) ABSTRACT

A matched rail and stile router bit set is constructed and arranged with cutting edge geometries which create radiused edges for the stile workpiece and at least one corresponding radiused recess in the rail workpiece.

8 Claims, 4 Drawing Sheets

MATCHED RAIL AND STILE ROUTER BIT SET

CROSS REFERENCE TO RELATED APPLICATIONS

This application claims the benefit of U.S. Provisional Application No. 61/368,829 filed Jul. 29, 2010, which is incorporated herein by reference.

BACKGROUND OF THE INVENTION

The disclosed embodiment is directed generally to woodworking and more specifically to wooden corner joints and the tooling which is suitable to create wooden corner joints.

In the construction of wood frames for applications such as doors, picture frames, cabinetry, etc., rail and stile members may be used to form a wooden corner joint. The "rail" member runs horizontally and the "stile" member runs vertically, at least according to the generally accepted conventions and definitions. Typically, one member is milled or machined with one or more projections (tenons) and recesses (mortises) and the other member is milled or machined with matching tenons and mortises, only in reverse. Further, these two members are milled or machined so that the joint (the tenon of the rail into the moritise of the stile and the tenon of the stile into the mortise of the rail) defines a right angled corner joint for the article being fabricated.

While different methods or techniques can be used for the machining or milling of the desired shapes into the rail and stile, one popular approach is to use a shaper cutter. Typically these woodworking machines have relatively large (over 3 inches in diameter) individual cutters which are received by a spindle. When used for rail and stile joints, there are typically three cutters and the individual cutters are able to overlap due to their mounting on the spindle. This arrangement and the ability to overlap enables the stile edges to be radiused Another option for milling (i.e., woodworking) a rail and stile joint is to use a router. The router receives a first router bit which is configured for the desired rail shapes (tenons and mortises) and the first portion of the corner joint is milled using the router and the selected router bit. Next, this first router bit is removed from the router and a second (matching) router bit is loaded into the router for the desired stile shapes. Since a tight and precise fit is important, these two router bits (rail and stile) are typically sold as a matched set. This means that whatever geometry might be selected, the two router bits create the tenons and mortises for that geometry where one is the reverse of the other. The orientation of each workpiece for each router bit cut (or cuts) is what determines that the joint will be a right angled corner joint. Some of the more common (matched) rail and stile geometries include ogee, shaker, round over, traditional, classical, bead and bevel. However, there are no actual restrictions on the geometry which one may select so long as the rail and stile router bits for that particular geometry are provided as a matched set so that one is the reverse of the other.

In terms of differences between using shaper cutters for a rail and stile versus using a matched router bit set, one difference is that the router bits are fixed on a shaft without the ability to overlap. Although multiple components are used in creating the stile bit, these components are secured together and fixed onto the shaft so as to create an integral unit (i.e., the stile bit). The same is true for the rail bit, although most of the components are different from those used in the stile bit.

As for the setup, the router is typically positioned beneath the worktable with the router bit extending upwardly, as shown by FIGS. 9 and 10 herein. The workpiece is positioned with the "good" side down on the upper surface of the worktable. A fence is typically used for alignment with the bearing. The thickness of the workpiece and the axial position of the stile router bit relative to the upper surface of the worktable will influence the mortise location and the tenon thickness. In the case of the rail router bit, these variables will influence the location of the tenon relative to the workpiece and the upper mortise. Importantly, all variables need to be "matched" for a precise fit of the two workpieces.

One of the requirements for the resultant wooden corner joint is that the rail and stile fit be somewhat tight and precise. Dimensions, tolerances, shapes, etc. are generally held to fairly exacting standards. As a part of these more precise shapes and exacting standards, the tenons and mortises typically have relatively sharp corners whether speaking of interior corner recesses or speaking of exterior corner edges.

One of the accepted limitations of router bit configurations for a rail and stile joint is that radiused edges on the stile are not considered to be possible or at least practical in view of the complexities and milling difficulties for the required router bit configurations.

This limitation, or at least the industry perception of this limitation, is based in part on the fact that the router bits are smaller (as compared to shaper cutters) and based in part on the fact that the bottom cutter is always attached to the shaft. As noted, the ability of the cutters to overlap is not possible with the router bits as it is with the shaper cutters.

In the milling of the rail and stile workpieces, including the resultant sharp corners (recesses and edges), all of which follows the traditional wisdom, it has been found that the wood stock being used for the desired corner joint will exhibit some chipping and splintering. If by chance this occurs in an area or region which is not visible once the joint is made, there may be fewer concerns. However, in all likelihood any chipping or splintering will be visible along the exposed edge of the stile which lays up against the interior panel of the article. Further, the joint is not considered to be as secure if there is any noticeable chipping and/or splintering of the wood stock.

The industry perception of router bit designs, and their design limitations, for a rail and stile joint is that creating radiused edges (and matching mortises) is not really a viable option. However, due to the continuing chipping and splintering issues, the radiused edge objective was the subject of additional design studies and trials resulting in the disclosed embodiment. As disclosed herein, a matched rail and stile router bit set is provided which creates a suitable edge radius as a way to try and minimize, or at least significantly reduce, any edge chipping and/or splintering problems.

BRIEF SUMMARY

A matched rail and stile router bit set is constructed and arranged with cutting edge geometries which create radiused edges for the stile workpiece and at least one corresponding radiused recess in the rail workpiece.

One object of the present disclosure is to describe an improved matched rail and stile router bit set.

DETAILED DESCRIPTION

Figure 1:
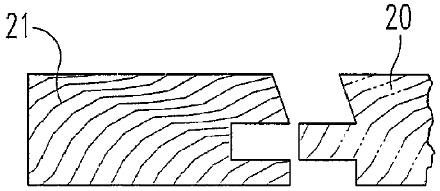
Fig. 1 (PRIOR ART)
FIG. 1 is a partial, exploded, front elevational view, in full section, of a prior art rail and stile joint showing one profile option.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring first to FIGS. 1-6, various prior art rail and stile shapes are disclosed for the workpieces which are to be joined (i.e., jointed) together for the wooden corner joint. There is a corresponding router bit for each illustrated rail and a corresponding router bit for each illustrated stile. The two matched router bits are typically sold as a set in order to achieve a precisely matched geometry and the resultant tight fit for the joint.

Figure 2:
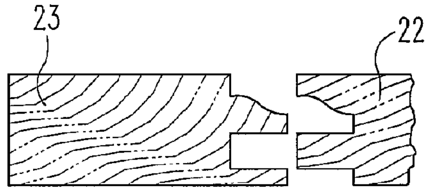
Fig. 2 (PRIOR ART)
FIG. 2 is a partial, exploded, front elevational view, in full section, of another prior art rail and stile joint showing another profile option.
Figure 3:
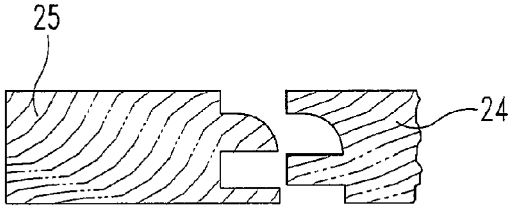
Fig. 3 (PRIOR ART)
FIG. 3 is a partial, exploded, front elevational view, in full section, of another prior art rail and stile joint showing another profile option.
Figure 4:
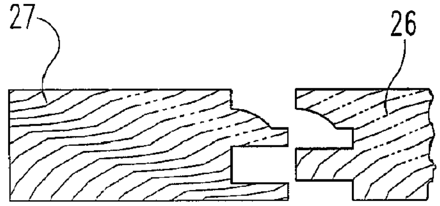
Fig. 4 (PRIOR ART)
FIG. 4 is a partial, exploded, front elevational view, in full section, of another prior art rail and stile joint showing another profile option.
Figure 5:
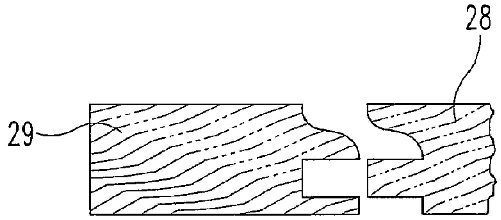
Fig. 5 (PRIOR ART)
FIG. 5 is a partial, exploded, front elevational view, in full section, of another prior art rail and stile joint showing another profile option.
Figure 6:
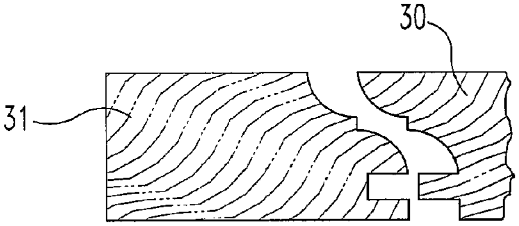
Fig. 6 (PRIOR ART)
FIG. 6 is a partial, exploded, front elevational view, in full section, of another prior art rail and stile joint showing another profile option.

FIGS. 1-6 are labeled as "prior art" since these examples reflect some of the rail and stile geometries which are currently offered. In FIG. 1, the rail 20 and stile 21 are configured as a shaker profile. In FIG. 2, the rail 22 and stile 23 are configured as an ogee profile. In FIG. 3, the rail 24 and stile 25 are configured as a round over. In FIG. 4, the rail 26 and stile 27 are configured as a bead profile. In FIG. 5, the rail 28 and stile 29 are configured as a traditional profile. In FIG. 6, the rail 30 and stile 31 are configured as a classic profile.

As mentioned above, conventional practice in terms of router bit design creates the rail and stile bits such that each interior corner recess is a relatively sharp corner approximating ninety degrees (90°) and each exterior corner edge is a relatively sharp corner approximating ninety degrees. The conventional practice in the design of the required router bits was to accept those bits which, by their configuration, would result in these relatively sharp corners and edges. The result though is that creating these sharp corners and edges causes chipping and/or splintering of the workpiece. Even though this problem existed, the difficulties in understanding how and where to modify the required router bits so as to avoid or reduce these sharp corners was not something known or practiced in terms of router bit designs. Further, there might have been a certain tolerance to accept some degree of chipping and/or splintering if it would occur in an area which might not be as visible in the final corner joint. However, even under those circumstances, chipping and/or splintering is still not desired.

Figure 7:
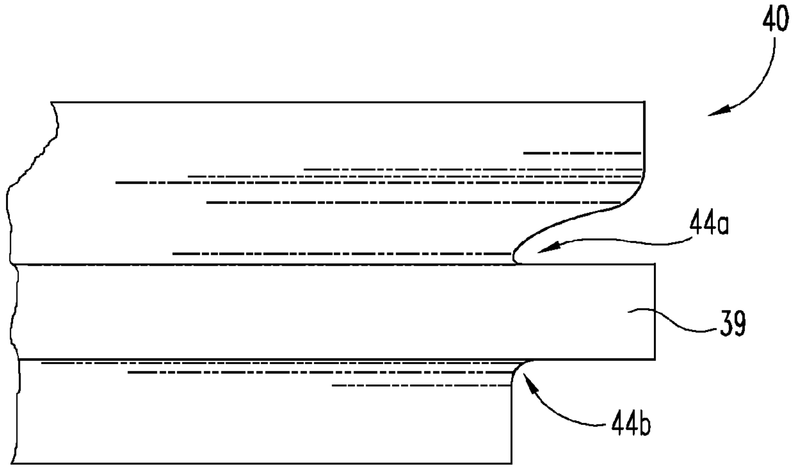
FIG. 7 is a partial, front elevational view of a rail workpiece.
Figure 8:
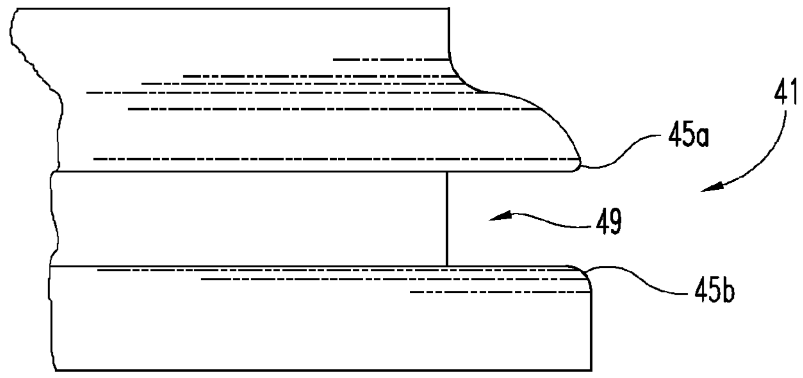
FIG. 8 is a partial, front elevational view of a stile workpiece.
Figure 9:
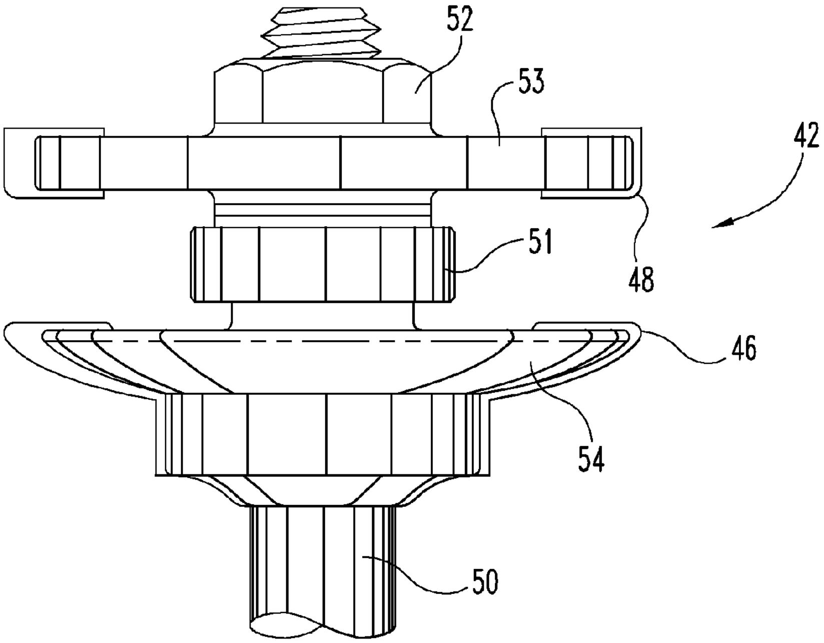
FIG. 9 is a front elevational view of a rail router bit according to the preferred embodiment.

Referring now to FIGS. 7 and 8, a rail workpiece 40 and a stile workpiece 41, respectively, are illustrated. A corner joint created by the interfit of rail 40 and stile 41 is illustrated in FIG. 11. The corresponding router bits 42 and 43, respectively, which are used to create each workpiece are illustrated in FIG. 9 (bit 42 for the rail 40) and in FIG. 10 (bit 43 for the stile 41). An important feature or characteristic of each workpiece 40 and 41 is the radiused inside corner 44*a* on the rail 40 and the radiused outer edge 45*a* and perhaps edge 45*b* on the stile 41. Radiused inside corner 44*a* is adjacent rail projection 39. The radiused outer edge 45*a* is adjacent rail recess 49. The router bit tooling is designed and arranged with the required radiused shapes in order to produce the desired and matching radiused shapes in the workpieces.

More specifically, the radiused inside corner 44*a* of the rail 40 is milled (via a router) by the use of router bit 42 which includes the overall desired geometry and importantly a radiused tip 46. The radiused outer edges 45*a* and 45*b* of the stile 41 are milled (via a router) by the use of router bit 43 which includes the overall desired geometry and importantly a radiused recess 47*a* for edge 45*a* and radiused recess 47*b* for edge 45*b*. The primary location or site for the possibility of any chipping and/or splintering (in the prior art constructions) is along these two outer edges of the stile. In the preferred embodiment, these two edges are edges 45*a* and 45*b* (see FIG. 8).

Since stile edge 45*a* will be visible on one side of the panel 60 or article (see FIG. 11), any chipping or splintering would also be visible. Stile edge 45*b* will be visible on the opposite side of the panel 60. If this opposite side is typically exposed, the radius or curved surface along edge 45*b* would be preferred. If this edge is typically hidden from view, the concern over chipping or splintering is not as great.

Importantly, it has been learned that by creating or adding a radiused shape (recesses 47*a* and 47*b*) to the stile router bit so as to radius edges 45*a* and 45*b*, any chipping and/or splintering of the workpiece can be significantly reduced (i.e., almost eliminated). In terms of relative numbers or dimensions, a significant reduction in the amount of chipping and/or splintering begins to show up with a radiused dimension of approximately 0.0312 inches (0.793 mm). Only very slight or modest improvement in the reduction of the amount of chipping and/or splintering is realized as the radius dimension increases up to approximately 0.156 inches (3.968 mm). Accordingly, radiuses in this range are seen as achieving the objective for the disclosed router bit designs. The selected radius dimension must also take into consideration the size of the workpiece and the dimensions of the tenons and mortises. Having too large of a radius would create other milling issues and concerns, such as the relative sizes of the tenons and mortises. The radiused geometry of edge 48 which is incorporated into the router bit 42 for the rail 40 creates the inside corner or recess 44*b* of the rail which receives edge 45*b*. Essentially the rail is milled to fit the pattern which is cut or milled for the stile 41. Other portions of each router bit include the shank 50, bearing 51, and hex nut 52.

Figure 10:
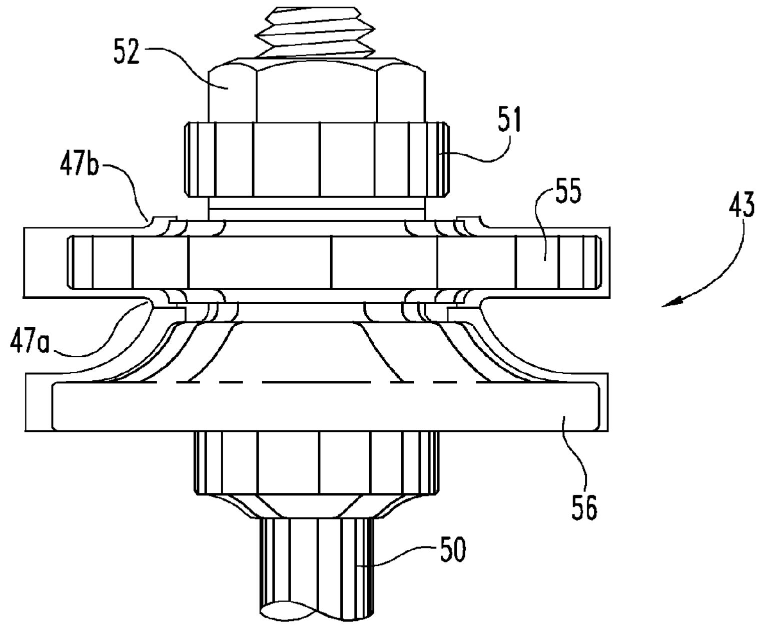
FIG. 10 is a front elevational view of a stile router bit according to the preferred embodiment.
Figure 11:
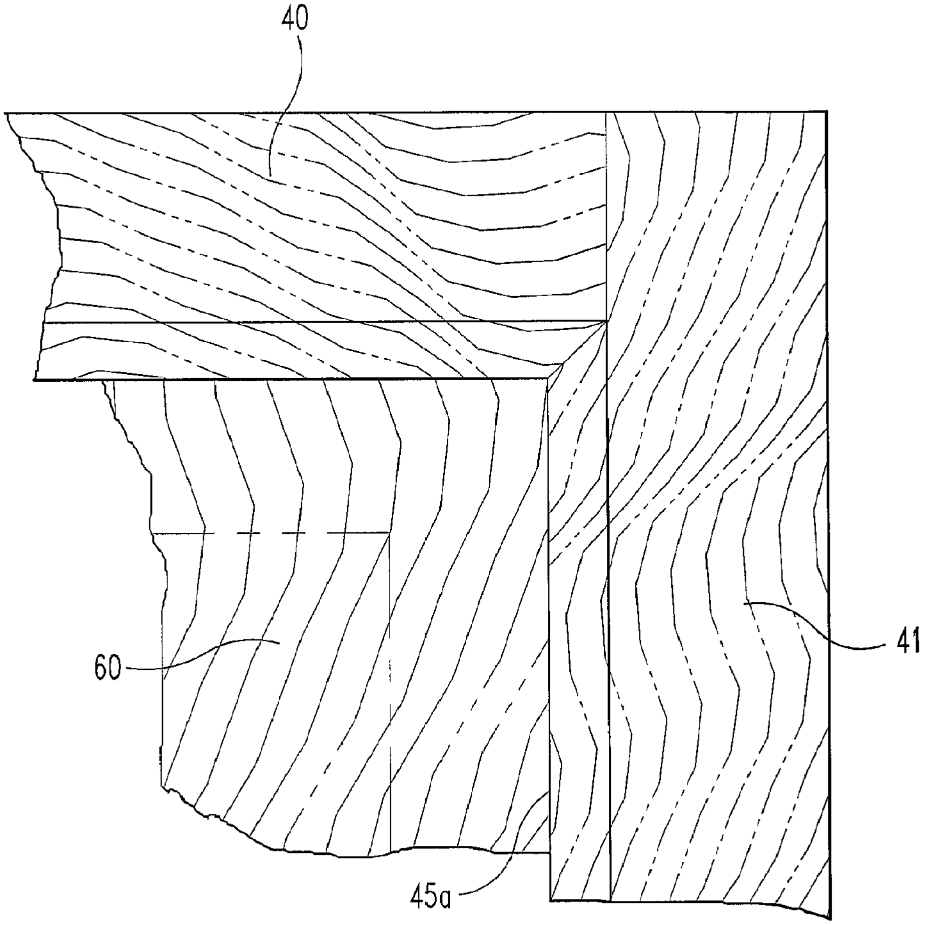
FIG. 11 is a partial, front elevational view of a corner joint for a wooden article using a rail and stile.

Since the assemblies of FIGS. 9 and 10 are being referred to herein as "bits", the actual cutting or machining portions include, for the rail router bit 42, a first cutting member 53 and a second cutting member 54. Cutting member 53 is received by shank 50 and cutting member 54 is also received by shank 50 and is spaced apart from cutting member 53. These two cutting members 53 and 54 as received by the shank 50 are spaced apart by bearing 51 which is also received by shank 50. The rounded edge 48 which is part of and defined by cutting member 53, has a size and shape which results in the wooden workpiece geometry at 44*b*. The radiused tip 46 as illustrated in FIG. 9 is defined by and a part of cutting member 54.

For the stile router bit 43, the first cutting member 55 is received by shank 50 and the second cutting member 56 is also received by shank 50 and is adjacent to the first cutting member 55. The adjacent stacking of cutting members 55 and 56 as received by shank 50 enable the proximity of these two cutting members to cooperatively define radiused recess 47*a*. Further, radiused recess 47*b* is defined by and a part of cutting member 55. Radiused recess 47*b* results in the rounded or radiused outer edge 45*b* in the FIG. 8 wooden workpiece.

As used herein, "radius" is intended to cover a rounded or curved shape with some point of that rounded or curved shape having a uniform or constant radius dimension. The key though is a smooth and continuous curvature for the router bit recesses which create the curved or rounded (i.e., radiused edges 45*a* and 45*b*) in the stile workpiece. While the terms "rail" and "stile" have been selected and used based on how these terms are normally defined, these terms could be reversed without any practical change or consequence to what has been described. Whichever workpiece provides edges 45*a* and 45*b*, whether it is called rail or a stile, since horizontal and vertical orientations can be flipped, it is those protruding edges which have the risk of chipping or splintering unless radiused according to the disclosed embodiments.

Further, while only the rail and stile profile has been selected for disclosing and illustrating the selected embodiment, the issues are essentially the same regardless of the selected profile and the solution, according to the selected embodiment, is essentially the same. Each of the profiles in FIGS. 1-6 have exposed edges which would exhibit a likelihood of chipping and/or splintering and which would benefit from the radiused re-shaping of those edges according to the selected embodiments.

While the preferred embodiment of the invention has been illustrated and described in the drawings and foregoing description, the same is to be considered as illustrative and not restrictive in character, it being understood that all changes and modifications that come within the spirit of the invention are desired to be protected.

What is claimed is:

1. A matched router bit set for a rail and stile system comprising:

A stile router bit including a shank, a first cutting member received by said shank and a second cutting member received by said shank and being positioned adjacent to said first cutting member, said first and second cutting members cooperatively defining a radiused recess with a size and shape; and a rail router bit including a shank, a first cutting member received by said shank and a second cutting member received by said shank, said second cutting member including a radiused tip wherein said radiused tip has a size and shape which generally matches the size and shape of the radiused recess of said stile router bit.

2. The matched router bit set of claim 1 wherein the first cutting member of said stile router bit defines an inner radiused surface having a size and shape.

3. The matched router bit set of claim 2 wherein the first cutting member of said rail router bit defines a rounded edge with a size and shape which generally matches the size and shape of the inner radiused surface of the first cutting member of said stile router bit.

4. The matched router bit set of claim 3 wherein the first and second cutting members of said rail router bit are spaced apart from each other as received by said shank.

5. The matched router bit set of claim 4 wherein said rail router bit further includes a bearing received by said shank and positioned on said shank between said first and second cutting members.

6. A wooden structure of at least two wooden members which are jointed together by a rail and stile joint, said wooden structure comprising:

a first wooden member having a radiused inside corner adjacent a rail projection; and a second wooden member having a radiused outer edge, wherein said first and second wooden members are jointed together to form a corner of the wooden structure and wherein said radiused inside corner has a size and shape and wherein said radiused outer edge has a size and shape which generally matches the size and shape of said inside corner.

7. The wooden structure of claim 6 wherein said first wooden member includes a second radiused inside corner having a size and shape.

8. The wooden structure of claim 7 wherein said second wooden member includes a second radiused outer edge having a size and shape wherein the size and shape of said second radiused outer edge generally matches the size and shape of said second radiused inside corner.

* * * * *